Aug. 2, 1938.    J. S. ROBERTSON    2,125,812
METHOD AND MEANS FOR SEPARATING GRANULAR MATERIAL
Filed Aug. 28, 1936
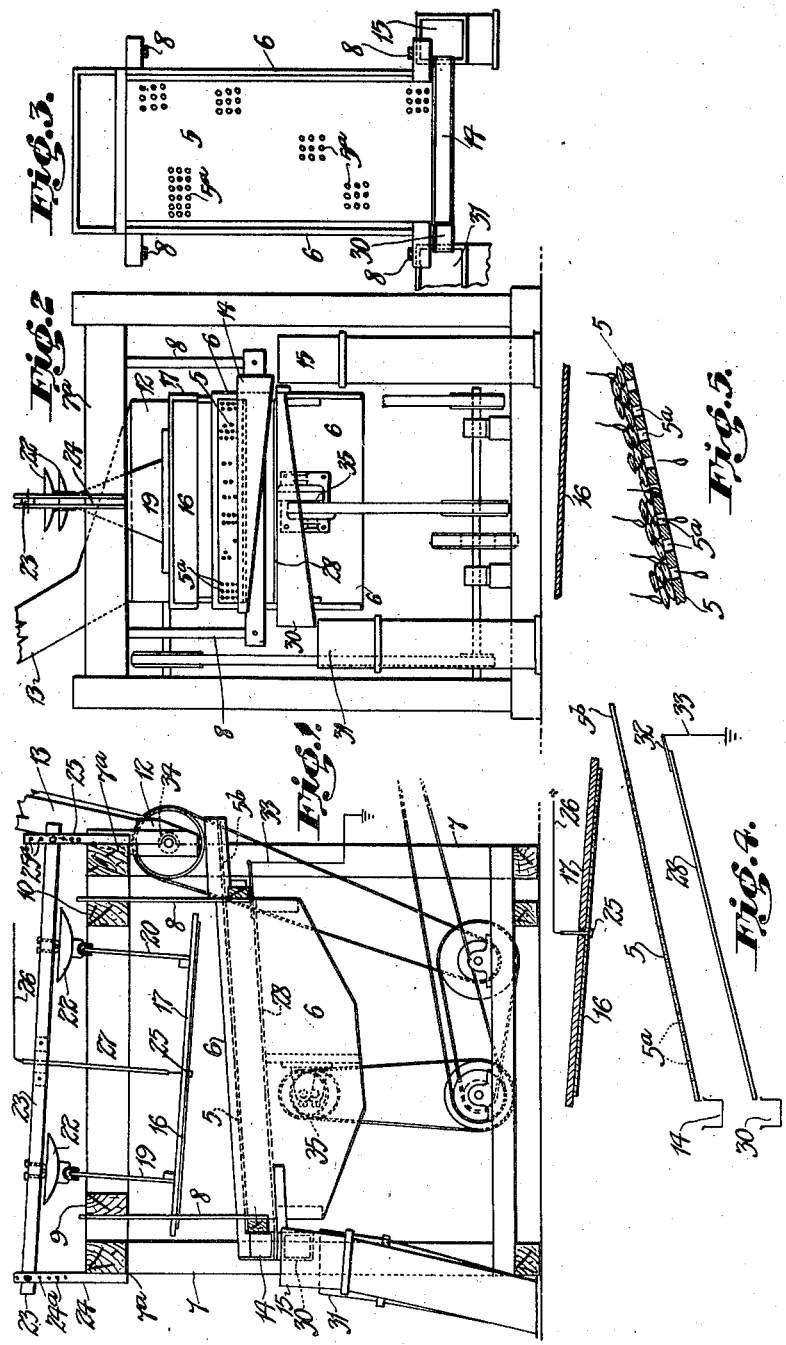

Patented Aug. 2, 193

2,125,812

UNITED STATES PATENT OFFICE 2,125,812

METHOD AND MEANS FOR SEPARATING GRANULAR MATERIAL

John Stephenson Robertson, Melbourne, Victoria, Australia

Application August 28, 1936, Serial No. 98,415
In Australia September 9, 1935

12 Claims. (Cl. 209—129)

The present invention relates to the separation from grain, granulated grain or granular material or the products of grain, in dry condition of foreign grain or matter which under known methods is attempted either by air currents operating to remove any lighter foreign matter or by vibratory sieving. In the former case the cost of producing and maintaining a predetermined air pressure is expensive, while in the latter case apart from the cost of setting up mechanical vibration the sieving operation is ineffective in separating out particles or grains of foreign matter having a long dimension which bridges the sieve openings, but which have also a short diameter capable of passage through the latter, for the reason that said foreign particles or grains persist in a position in which the long diameter lies in a horizontal plane bridging the sieve openings.

For example in the treatment of oats the foreign grain or matter usually comprises wild wheat known as "drake" or "darnel" having a narrow granular body with an elongated tail or whisker which provides an overall length considerably greater than the diameter of the sieve openings which creates difficulty in separating the foreign grain or "drake" from the mass of grain as above described.

The object of this invention is to provide a method of separation whereby the said foreign matter or grain is influenced to assume a position with the long dimension disposed in a substantially vertical plane so as to permit the passage of the foreign material or grain through the openings of a sieve or the like whereby it is separated from the main mass of granular matter which proceeds along the surface of the sieve.

According to this invention the object above stated is achieved by subjecting the mass of granular material as it proceeds along the surface of a sieve or the like to the influence of an electrostatic field which operates to upend the lighter foreign particles therein so that the latter assume a position with the long dimension substantially vertical and permits the same to pass through the sieve without preventing the passage of the main mass of granular material over the sieve.

In practice the electrostatic field may be arranged relative to path of the mass of the granular material and a relative motion set up in said grain whereby the latter passes within the zone of the field, the intensity of the electrostatic force of the field being determined by the ratio of the specific gravity of the foreign particles to that of the remaining units or grains in the mass.

The mass may pass through the zone mentioned supported upon an inclined perforated sieve or mesh surface preferably subjected to vibration and adapted to retain the main grain units while the foreign matter or grain influenced by the electrical field will be upended to bring the short dimension into a position permitting the particles to pass through the perforations or mesh when the influence stated is no longer impressed thereon or has decreased to such an extent as to permit said particles to drop through the said perforations.

One embodiment of an apparatus for carrying out the method herein described consists of a vibratory inclined sieve or the like across which the granular material is delivered in a thin stream, means being provided to subject the mass of granular material to the influence of an electrostatic field to cause the foreign matter or particles to assume a substantially vertical or upended position to permit the same to pass through the sieve openings to separate from the main mass of granular material.

The electrostatic field is created by a field plate charged from a source of electrical energy, the former being superimposed above the inclined sieve and diverging towards the input end of the latter, a uniform inclined plate being located under the sieve to receive the foreign matter or particles which drop through the openings in said sieve, the inclined plate being suitably earthed to complete the electrical circuit so that the sieve extends through the zone of electrical field emanating from the field plate.

One practical embodiment of an apparatus for carrying the herein described method into effect is illustrated by way of example in the accompanying drawing in which—

Fig. 1 is a side elevation of the apparatus with transverse frame members in section, and—

Fig. 2 is an end elevation of Fig. 1.

Fig. 3 is a plan of the vibratory riddle or sieve.

Fig. 4 is a sectional view illustrating the relationship of the vibratory riddle or sieve to the electrostatic field plate.

Fig. 5 is an enlarged fragmentary section illustrating in detail the operation of separating the foreign grain or "drake" from the granular material.

In the apparatus illustrated the vibratory riddle or sieve 5 is mounted longitudinally in the top of a riddle box 6 of standard shape and construction. The box 6 is supported at an incline between the frame uprights 7 on spaced vertical rocker arms 8 depending from transverse frame members 9 and 10 as illustrated in Figs. 1 and 2. The inclination of the box 6 imparts a corresponding inclination to the sieve or riddle 5 to provide a gravity feed for the grain which is discharged from a hopper 12 onto the upper plane surface 5b of the sieve or riddle 5 which projects beyond the end of the box 6. The hopper 12 is attached to a chute 13 to receive the grain to be seperated.

The lower discharge end of the sieve or riddle 5 has disposed along its edge a transverse inclined tray 14 to collect the cleaned or separated grain to deliver the same into a chute 15 or the like to effect the passage of the grain to a place of collection.

Superimposed above the sieve or riddle 5 at an opposed inclination thereto is an electrostatic field plate 16, the area of which is approximately equal to that of said sieve or riddle 5. The field plate 16 is attached to an insulated backing 17 of ebonite or the like to which is attached spaced supporting arms 19 and 20 pivotally mounted at the upper ends thereof to high tension insulators 22 of the type illustrated in Figs. 1 and 2, which are fitted on an adjustable bar 23 carried between spaced straps 24 and 25 erected on the upper transverse frame members 7a at each side of the apparatus. The straps 24 and 25 are slotted as at 24a and 25a to permit the bar 23 to be raised or lowered relative thereto in order to vary the inclination or setting of the field plate 16 in relation to the sieve or riddle 5.

The field plate 16 at the centre is provided with a terminal 25 which connects the electrical lead 26 which extends through an insulated conduit 27 supported on the adjustable bar 23, to connect the source of electrical energy from which the field plate is charged. In an experimental form of the apparatus the lead 26 was connected to the terminal of a Wimshurst machine. Located in the rockable box 6 and spaced below the inclined sieve or riddle 5 is a uniform plate 28 onto which the separated foreign matter or "drake" drops after passing through the perforations 5a in said sieve or riddle 5. The plate 28 is similarly inclined to deliver the separated matter or "drake" into a transverse inclined tray 30 adapted to pass the same into a chute 31 for discharge into a suitable place of collection. The plate 28 has fitted to its upper end a terminal 32 to which is connected a lead 33 to earth to complete the electrical circuit of the apparatus.

The hopper 12 has disposed therein a feed roller 34 which directs the grain to be treated in a thin uniform stream onto the upper plane end of the sieve or riddle, the roller 34 being driven by the pulley and belt drive illustrated in Figs. 1 and 2.

The box 6 has fitted on the underside thereof an eccentric vibratory gear 35 of standard construction to impart the shaking or vibratory motion to sieve or riddle 5.

As illustrated in Fig. 4 the field plate 16 and sieve or riddle 5 are arranged in opposed inclined and divergent relationship towards the upper feed in end of the apparatus, the said sieve or riddle 5 being located longitudinally between said field plate 16 and the lower uniform plate 28 which is connected to earth, is operatively disposed in the zone of the field emanating from the field plate 16.

The operation of the apparatus is as follows:—

The granular material or grain such as oats is fed in a thin stream from the hopper 12 onto the upper end of the sieve or riddle 5, the inclination and vibration of which causes the grain to travel down the said sieve or riddle. The field plate 16 is charged whereby an electrostatic field is set up, the lower half of which surrounds the sieve or riddle 5 and accordingly the particles of grain and the 'drake" are charged and have the tendency to lift off the sieve 5 and move upwardly towards the field plate 16.

The mass or specific gravity of the grains of granular material, in relation to the intensity of the attractive force of the field plate 16 is such that they are not raised from the sieve 5 but remain thereon on their longitudinal axes, but the lighter foreign particles are immediately influenced by the electrostatic field to assume an upended position i. e. with the longitudinal axis substantially vertical. The influence of the abovementioned field retards the flow of the mass of granular material at the input end where the close proximity of the field plate to the sieve or riddle imparts the maximum intensity to the mass, but the vibratory motion of the sieve or riddle disintegrates said mass which uncovers the perforations 5a to permit the lighter particles to fall through said perforations 5a as illustrated in detail in Fig. 5 while the main grains pass down the surface of the sieve 5 to fall into the tray 14 and then gravitate into the chute 15. The discharge end of the sieve or riddle having the maximum divergence from the field plate 16 is practically immune from the influence of the field so that the clearance of the separated granular material is accelerated, which prevents choking on the sieve or riddle.

The foreign matter on falling through the perforations 5a drop onto the lower plate 28 to gravitate into the tray 30 and thence into the chute 31.

Experimental work has indicated that with an 18" x 36" field plate 16 and inclined sieve 5 arranged at a distance apart of 7 inches at the upper end and 12" at the lower end and with an electrostatic field having an intensity approximating 100,000 volts, satisfactory results are obtained in carrying out the method previously described for the separation of 'drake" from oats.

I claim:—

1. Apparatus for the separation of granular material wherein the particles are of different shapes comprising, a sieve inclined in one direction and having the openings thereof of such size as to permit particles of the general shape to pass therethrough when upended, means for vibrating the sieve, means for feeding the granular material onto the upper end of said sieve, an electrode arranged adjacent to and oppositely inclined with respect to said sieve, a second electrode associated with said sieve, an electrical source connected with said electrodes, whereby the longer particles of the granular material in moving down said sieve are upended by the electrostatic field, means for collecting the particles which pass over said sieve and means for separately collecting the particles which pass through said sieve.

2. Apparatus for the separation of elongated granular material from particles of more regular shape comprising, a sieve inclined in one direction and having the openings thereof of such size as to allow the elongated particles to pass longitudinally therethrough, means for vibrating the sieve, means for feeding the granular material onto the upper end of said sieve, an electrode arranged adjacent to and oppositely inclined with respect to said sieve, means for adjusting the inclination of said electrode, a second electrode associated with said sieve, an electrical source connected with said electrodes, whereby the mixed material in moving down said sieve is subjected to a decreasing electrostatic field, means for collecting the particles which pass over said sieve and means for separately collecting the particles which pass through said sieve.

3. Apparatus for the separation of granular material wherein the major dimensions of the particles are unequal comprising, a sieve inclined in one direction having openings therein of a diameter slightly larger than the minor dimension of the particles, means for vibrating the sieve, means for feeding the granular material onto the upper end of said sieve, an electrode associated with and oppositely inclined with respect to said sieve, a second electrode positioned below said sieve arranged substantially parallel thereto, an electric source, connected with said electrodes, so that the granular material is subjected to a relatively strong electrostatic field when first deposited on said sieve which gradually decreases in strength towards the lower end of the sieve, said electrostatic field being of a strength at the upper portion of the sieve so as to cause only the particles having the larger major dimension to be erected on said sieve whereby such erected particles pass through said sieve when they move into the decreased electrostatic field.

4. Apparatus for the separation of wild wheat from oats comprising a sieve inclined in one direction at a given angle with respect to the horizontal, said sieve having an opening therein of a diameter smaller than the length of said grains, means for vibrating the sieve, means for feeding the mixed grain onto the upper end of said sieve, an electrode arranged above said sieve, said electrode being oppositely inclined with respect to said sieve, the upper end of said electrode being positioned away from said sieve in a given spaced relation, the lower end of said electrode being positioned above said sieve at a distance of 12/7 times that of said upper end, a second electrode positioned below said sieve arranged substantially parallel thereto, a source of electrical energy connected to said electrodes so that said grain in moving down said sieve moves through an electrostatic field of gradually decreasing strength, whereby the wild wheat is upended at the upper end of the sieve and permitted to pass through the opening of said sieve when said upended particles move towards the lower end of the sieve.

5. The method of separating elongated granular material from more regular shaped particles which comprises, depositing such mixed material onto an inclined sieve having openings therein of such a size as to permit the minor dimension of the elongated particles to pass therethrough, imparting vibrating motion to the mixed material to cause the same to move downwardly over said sieve, subjecting the mixed material to an electrostatic field of such intensity as to upend only the elongated particles, and thereafter moving the particles into an electrostatic field of gradually decreasing intensity, so that the elongated particles pass through the sieve in the upended position and are thus separated from the more regular shaped particles.

6. The method of separating elongated particles from more regularly shaped particles of a greater density which comprises, depositing such mixed material onto an inclined sieve having openings therein of such a size as to permit the minor dimension of the elongated particles to pass therethrough, imparting vibrating motion to the mixed material to cause the same to move downwardly over said sieve, subjecting the mixed material to an electrostatic field of such intensity as to upend only the lighter elongated particles and thereafter causing all of the particles to move to an electrostatic field of a lesser intensity, whereby the lighter elongated particles are permitted to pass through the openings in the sieve in an upended position and are thus separated from the more regular shaped particles.

7. An improved method for dry separation of foreign matter or grain from granular material consisting in subjecting a mass of granular material proceeding over a sieve, to the influence of an electrostatic field of gradually decreasing strength whereby only the elongated foreign particles of matter or grain are positioned to permit the passage of same lengthwise through the openings in said sieve without preventing the passage of the main mass of granular material over said sieve.

8. Apparatus for effecting the separation of granular material comprising, an inclined vibratory sieve over which the granular material is delivered in a thin stream, the average diameter of the sieve opening being greater than the minor average diameter of the particles to be separated, a divergent electrode superimposed above said sieve, an electrical source connected to said electrode to create an electrostatic field of gradually diminishing strength through which said mass of material passes in moving over said sieve.

9. Apparatus for effecting the separation of granular material comprising, an inclined vibratory sieve over which the granular material is delivered in a thin stream, the opening of said sieve having an area greater than the smallest cross-sectional area of some of the particles of the granular material, a divergent electrode superimposed above said sieve, an electrical source connected to said electrode and to the earth, a plate located below said sieve electrically connected to earth, whereby said sieve is located in the zone of an electrostatic field of gradually diminishing strength.

10. In apparatus according to claim 9 wherein means are provided to adjust the position of said electrode relative to the sieve and thus vary the intensity of the electrostatic field.

11. Apparatus for effecting the separation of granular material comprising, an inclined vibratory sieve over which the granular material is delivered in a thin stream, the openings in said sieve being larger than the maximum thickness or short diameter of the thin elongated foreign particles of matter in said granular material, an electrically charged electrode superimposed above the sieve and diverging from the input end of the latter, whereby the granular material in passing over said sieve moves through an electrostatic field of gradually diminishing strength.

12. In apparatus according to claim 9 wherein the superimposed electrode and vibratory sieve diverge from the position where the granular material is delivered onto said sieve.

JOHN STEPHENSON ROBERTSON.